United States Patent

No

[11] Patent Number: 5,842,044
[45] Date of Patent: Nov. 24, 1998

[54] INPUT BUFFER DEVICE FOR A PRINTER USING AN FIFO AND DATA INPUT METHOD

[75] Inventor: Chang Hyun No, Kyoungki-do, Rep. of Korea

[73] Assignee: Hyundai Electronics Co. Ltd., Rep. of Korea

[21] Appl. No.: 456,678

[22] Filed: Jun. 1, 1995

[30] Foreign Application Priority Data

Jun. 29, 1994 [KR] Rep. of Korea .................. 1994-15295

[51] Int. Cl.⁶ .................................................. G06F 13/00
[52] U.S. Cl. ........................... 395/873; 395/872; 395/877
[58] Field of Search .................... 395/250, 109, 395/115, 873, 872, 877, 114

[56] References Cited

U.S. PATENT DOCUMENTS

| | | | |
|---|---|---|---|
| 4,048,625 | 9/1977 | Harris, Jr. et al. ...................... | 364/900 |
| 4,569,034 | 2/1986 | Findley et al. .......................... | 364/900 |
| 5,163,123 | 11/1992 | Kadono ................................... | 395/116 |
| 5,199,101 | 3/1993 | Cusik et al. ............................ | 395/115 |
| 5,315,691 | 5/1994 | Sumiya et al. ......................... | 395/109 |
| 5,355,441 | 10/1994 | Kawai et al. ........................... | 395/115 |
| 5,388,074 | 2/1995 | Buckenmaier ..................... | 365/189.05 |
| 5,553,201 | 9/1996 | Muramatsu ............................. | 395/109 |

Primary Examiner—Parshotam S. Lall
Assistant Examiner—Saleh Najjar
Attorney, Agent, or Firm—Fish & Richardson P.C.

[57] ABSTRACT

In an input buffer device for a printer using a first-in-first-out (FIFO) which can improve the data processing speed of a printer by receiving data from a host computer and processing the data by several bytes in a central processing unit (CPU) of the printer, and data input method, the input buffer device for a printer adopts an FIFO for generating an interrupt to the CPU for each input time of a predetermined byte unit of data, so that the performance of the CPU is improved by several times, the load of the CPU is prevented and the data processing speed is improved, thereby improving the overall system performance.

2 Claims, 2 Drawing Sheets

INPUT BUFFER DEVICE FOR A PRINTER USING AN FIFO AND DATA INPUT METHOD

BACKGROUND OF THE INVENTION

The present invention relates to an input buffer for a printer using a first-in-first-out (FIFO) which can improve the data processing speed of a printer by receiving data from a host computer and processing the data by several bytes in a central processing unit (CPU) of the printer, and data input method, which can be adopted for all systems receiving data through an input buffer.

In general, when a printer receives data from a host computer, an interrupt is produced toward the CPU of the printer for each input time of 1 byte of data. At this time, the CPU processes the data of the input buffer by 1 byte by means of a latch.

Whenever 1 byte of data is processed in such a manner, an interrupt signal controls the current CPU work to be in a wait state, thereby lowering the overall performance of the CPU. As the result, the performance becomes much lower when the CPU whose performance is poor is used.

Meanwhile, U.S. Pat. No. 5,199,101 discloses an art for improving the performance of the printer using an FIFO, by which an image or image data between a print memory and high-speed printer is printed after changing their directions by 90°. Scanning directional m-bit pixels are sequentially stored in first FIFO memory array having each FIFO memory in a cycle of m/p by n- rows. Thereafter, the second m-bit pixels are sequentially stored in second FIFO memory array so as to be printed in a high speed in each serial state. However, this technique cannot be adopted for improving a transfer method.

SUMMARY OF THE INVENTION

To solve the above-described problems, the present invention can improve the performance of a CPU by several times by connecting an FIFO for temporarily storing and outputting data of a predetermined unit of bytes with an input buffer for a printer to thereby generate an interrupt to the CPU each inputting time for data of a predetermined unit of bytes.

In other words, the input buffer for a printer according to the present invention is constituted such that the FIFO is parallel connected with a latch for temporarily storing the data of several bytes and then processing the data by 1 byte, and a jumper for selectively controlling each interrupt signal generated from the latch and FIFO is connected with an interrupt control logic so as to selectively use the latch and FIFO depending on the performance of the printer during a data input.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
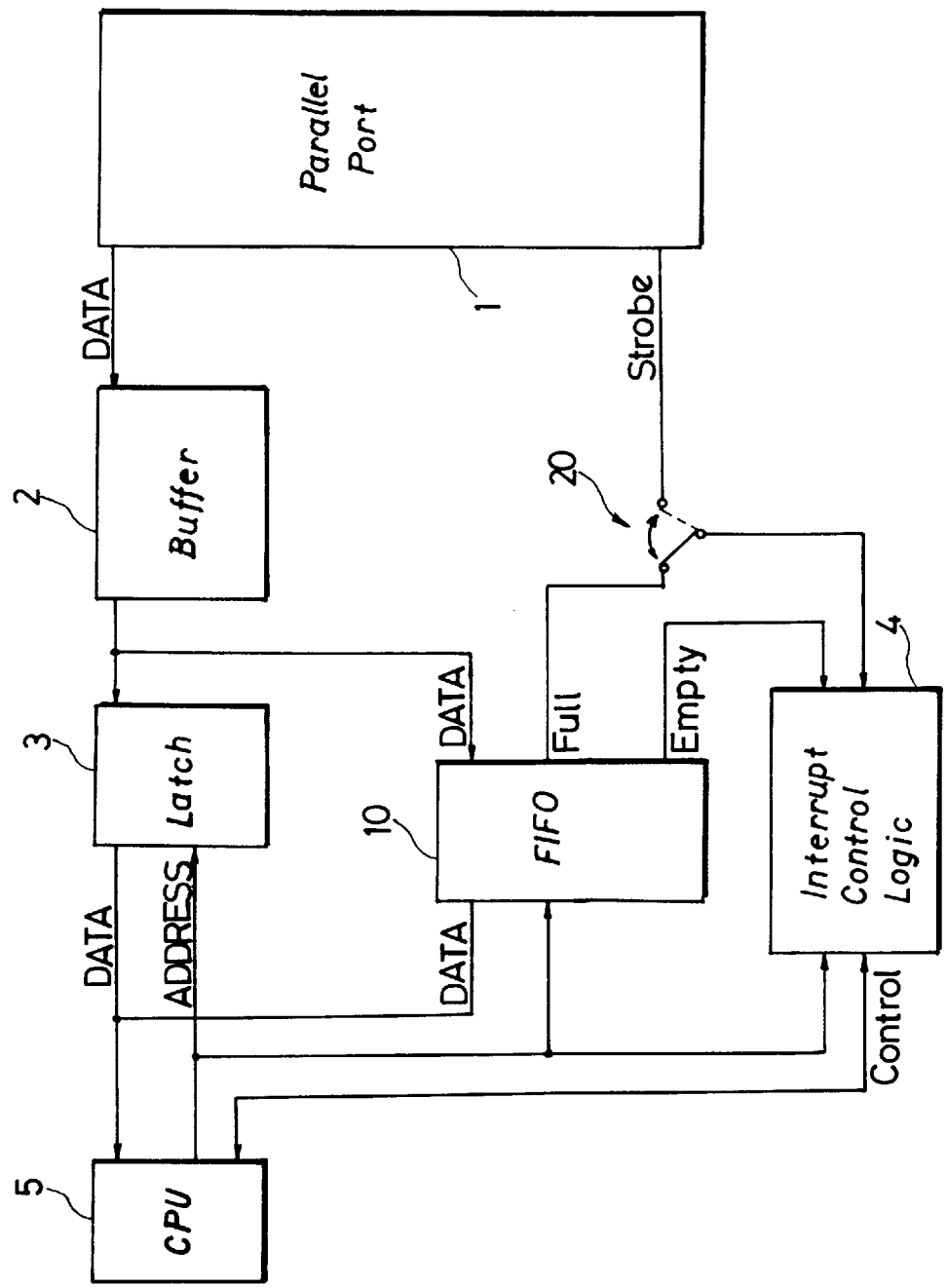
FIG. 1 is a block diagram of an input buffer for a printer according to the present invention.

In FIG. 1, the input buffer for a printer having a parallel port 1 for receiving data from a host computer, a buffer 2 for temporarily storing the data output from the parallel port 1 and then outputting the same, a latch 3 for inputting the data stored in the buffer 2 to a CPU 5 by 1 byte, and an interrupt control logic 4 for outputting an interrupt signal by a strobe signal STROBE generated from the host computer to thereby control the CPU 5, the input buffer includes an FIFO 10 parallel-connected to the latch 3, and a jumper for selectively inputting a strobe signal from the host computer or an FIFO memory full signal FULL.

The FIFO used in the present invention is preferably a 1024 byte FIFO. The operation of the present invention will now be described.

When the jumper 20 is connected with the signal transmitted from the FIFO, the data DATA input from the host computer is stored in the FIFO, i.e., 1024 byte FIFO 10, via a buffer 2. If 1024 bytes of data are all stored, the full pin of the FIFO 10 transfers an FIFO memory full signal FULL to the CPU 5 through the interrupt control logic 4. The CPU 5 reads the data DATA from the FIFO and processes the same until an FIFO memory empty signal EMPTY is generated.

Figure 2:
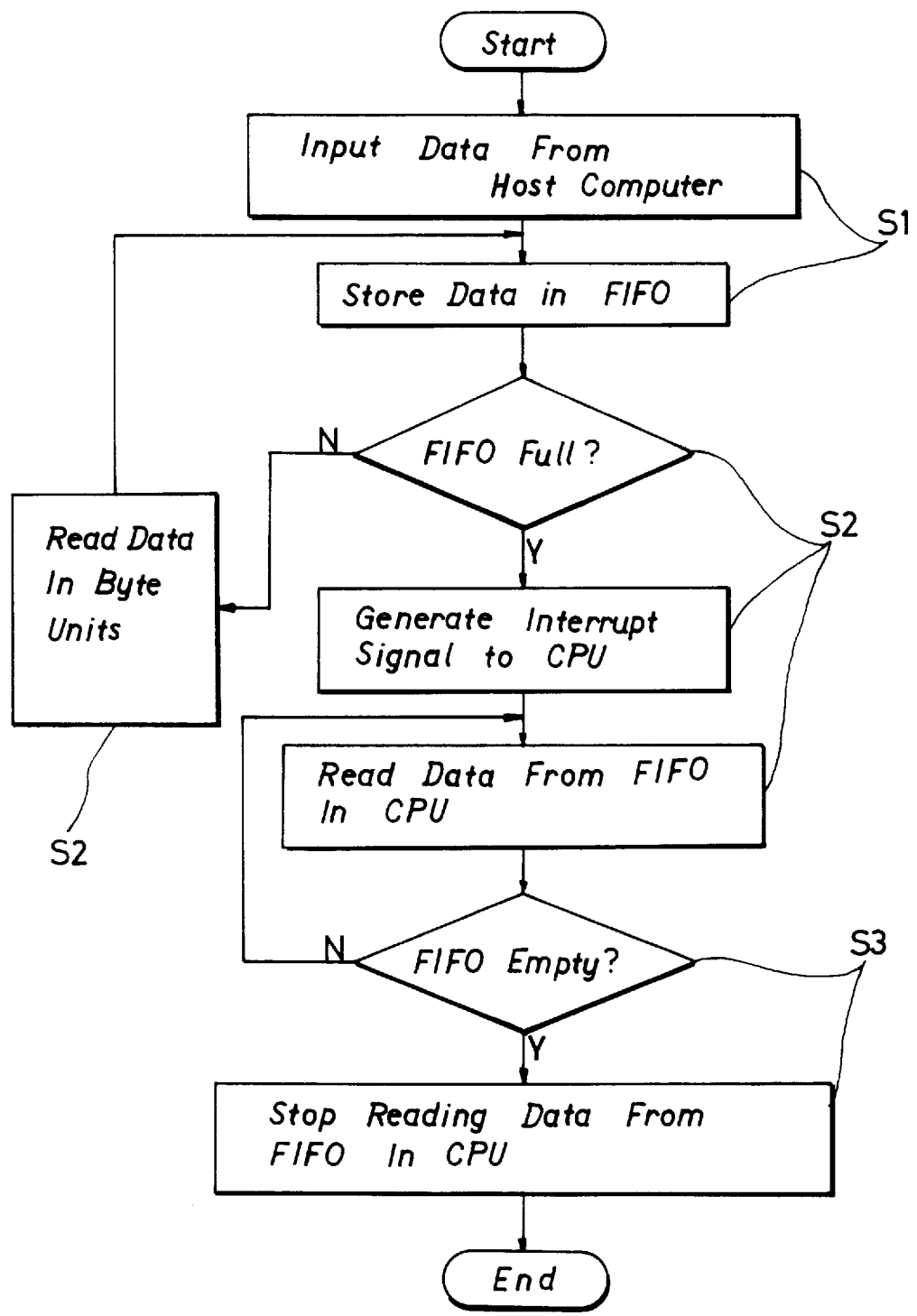
FIG. 2 is a flowchart showing the operation of the present invention.

FIG. 2 is a flowchart showing the operation of the present invention. The operation is executed by sequential steps of: receiving data from a host computer and storing the data in an FIFO (step S1); determining whether the FIFO is full or not, and reading data input from the host computer in the byte unit and continuously storing the data if the FIFO is not full, or transferring the interrupt signal to the CPU to perform a data reading operation (step S2); and reading the data from the CPU and transferring the interrupt signal to the CPU to stop the data reading operation if the FIFO is empty (step S3).

As described above, according to the present invention, by connecting an input buffer for a printer with an FIFO, the data input from a host computer is processed by several bytes so that the load of a CPU is prevented and the data processing speed is improved, thereby improving the overall system performance.

What is claimed is:

1. An input buffer device for a printer using an FIFO, having a parallel port for receiving data from a host computer, a buffer for temporarily storing the data output from said parallel port and then outputting the same, a latch for inputting the data stored in said buffer to a CPU by 1 byte, and an interrupt control logic for outputting an interrupt signal when receiving a strobe signal generated from said host computer to thereby control said CPU, said input buffer comprising:

an FIFO connected in parallel with said latch; and a jumper for selectively receiving a strobe signal output from said host computer and an FIFO memory full signal.

2. A method for inputting data from a host computer to a printer using an FIFO, said step comprising the steps of:

receiving data from a host computer and storing said data in said FIFO;

determining whether the FIFO is full or not, and reading data input from said host computer in the byte unit and continuously storing said data if the FIFO is not full, or transferring the interrupt signal to a CPU to perform a data reading operation if the FIFO is full; and reading the data output from the FIFO into the CPU and transferring said interrupt signal to said CPU to stop the data reading operation if the FIFO is empty.

* * * * *